United States Patent
Liao et al.

(10) Patent No.: US 11,699,457 B2
(45) Date of Patent: Jul. 11, 2023

(54) TESTING SYSTEM, CRACK NOISE MONITORING DEVICE AND METHOD FOR MONITORING CRACK NOISE

(71) Applicants: GLOBAL UNICHIP CORPORATION, Hsinchu (TW); TAIWAN SEMICONDUCTOR MANUFACTURING COMPANY, LTD., Hsinchu (TW)

(72) Inventors: Chih-Chieh Liao, Hsinchu (TW); Chih-Feng Cheng, Hsinchu (TW); Yu-Min Sun, Hsinchu (TW)

(73) Assignees: GLOBAL UNICHIP CORPORATION, Hsinchu (TW); TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 169 days.

(21) Appl. No.: 17/314,052

(22) Filed: May 7, 2021

(65) Prior Publication Data
US 2022/0293121 A1  Sep. 15, 2022

(30) Foreign Application Priority Data
Mar. 15, 2021 (TW) .................................. 110109191

(51) Int. Cl.
*G01N 29/14* (2006.01)
*G10L 25/51* (2013.01)
(Continued)

(52) U.S. Cl.
CPC .............. *G10L 25/51* (2013.01); *G01N 29/14* (2013.01); *H04R 1/2876* (2013.01); *H04R 7/16* (2013.01);
(Continued)

(58) Field of Classification Search
CPC .................... G10L 25/51; G01N 29/14; G01N 2291/2697; G01N 29/225; H04R 1/2876;
(Continued)

(56) References Cited

U.S. PATENT DOCUMENTS

| | | | |
|---|---|---|---|
| 2019/0064258 A1* | 2/2019 | Liao | G01R 31/2896 |
| 2019/0257793 A1* | 8/2019 | Yazzie | G01N 29/4445 |
| 2020/0033297 A1* | 1/2020 | Rudyk | G01N 29/14 |

FOREIGN PATENT DOCUMENTS

TW  201532164 A  8/2015

* cited by examiner

*Primary Examiner* — Xin Y Zhong
(74) *Attorney, Agent, or Firm* — CKC & Partners Co., LLC

(57) ABSTRACT

A testing system includes a testing apparatus and a crack noise monitoring device. The testing apparatus includes a testing stage and an element pickup module for pressing a semiconductor element on the testing stage. The crack noise monitoring device includes a database unit, a sound conduction set, a voiceprint generation unit and a processing unit. The database unit has a first voiceprint pattern. The sound conduction set is connected to the voiceprint generation unit and the testing apparatus for transmitting a sound wave from the semiconductor element to the voiceprint generation unit. The voiceprint generation unit receives and converts the sound wave into a second voiceprint pattern. The processing unit is electrically connected to the voiceprint generating unit and the database unit for determining whether the first voiceprint pattern is identical to the second voiceprint pattern.

18 Claims, 7 Drawing Sheets

(51) Int. Cl.
  *H04R 1/28* (2006.01)
  *H04R 7/16* (2006.01)
  H04R 1/34 (2006.01)
  H04R 7/04 (2006.01)
  H04R 19/04 (2006.01)
(52) U.S. Cl.
  CPC ............... *H04R 1/342* (2013.01); *H04R 7/04* (2013.01); *H04R 19/04* (2013.01); *H04R 2201/003* (2013.01)
(58) Field of Classification Search
  CPC . H04R 7/16; H04R 1/342; H04R 7/04; H04R 19/04; H04R 2201/003
  See application file for complete search history.

TESTING SYSTEM, CRACK NOISE MONITORING DEVICE AND METHOD FOR MONITORING CRACK NOISE

RELATED APPLICATIONS

This application claims priority to Taiwan Application Serial Number 110109191, filed on Mar. 15, 2021, which is herein incorporated by reference.

BACKGROUND

Field of Disclosure

The present disclosure relates to a testing system. More particularly, the present disclosure relates to a testing system capable of monitoring crack noise, a crack noise monitoring module and a method for monitoring crack noise.

Description of Related Art

With the rapid development of electronic technology and the appearance of high-tech electronical industries in recent years, electronic products with more user-friendly and better function are constantly introduced and designed in the trend of light and compact.

However, when a semiconductor element (referred to a device under test, DUT) is pressed down on a testing area for a testing procedure, since the semiconductor device is caused to be damaged or cracked under pressure, a defective rate is often increased so as to increase subsequent quality control costs and maintenance costs.

Therefore, the above-mentioned method still has inconveniences and shortcomings, which needs to be further improved. Therefore, how to effectively solve the above-mentioned inconveniences and shortcomings is one of the current essential research and development topics, and it has also become an urgent need for improvement in related fields.

SUMMARY

One aspect of the present disclosure is to provide a testing system, a crack noise monitoring device and a method for monitoring crack noise to solve the aforementioned problems of the prior art.

In one embodiment of the present disclosure, a testing system is provided, and includes a testing apparatus and a crack noise monitoring device. The testing apparatus includes a testing stage and an element pickup module for pressing a semiconductor element on the testing stage. The crack noise monitoring device includes a database unit, a sound conduction set, a voiceprint generation unit and a processing unit. The database unit includes at least one first voiceprint pattern. The sound conduction set is connected to the voiceprint generation unit and the testing apparatus for transmitting a sound wave of the semiconductor element to the voiceprint generation unit after the sound wave is sent to the sound conduction set via the testing apparatus. The voiceprint generation unit receives and converts the sound wave into a second voiceprint pattern. The processing unit is electrically connected to the voiceprint generating unit and the database unit for comparing the first voiceprint pattern and the second voiceprint pattern to determine whether the first voiceprint pattern is identical to the second voiceprint pattern.

In one embodiment of the present disclosure, a crack noise monitoring device is provided, and the crack noise monitoring device is suitable for detecting whether a semiconductor element being tested on a testing apparatus is cracked. The crack noise monitoring device includes a database unit, a sound conduction set, a voiceprint generation unit and a processing unit. The database unit includes at least one first voiceprint pattern. The voiceprint generation unit receives a sound wave and convert the sound wave into a second voiceprint pattern. The sound conduction set is connected to the voiceprint generation unit and the testing apparatus for transmitting the sound wave to the voiceprint generation unit, and the sound wave is sent from the semiconductor element to the sound conduction set via the testing apparatus. The processing unit is electrically connected to the voiceprint generating unit and the database unit for comparing the first voiceprint pattern and the second voiceprint pattern to determine whether the first voiceprint pattern is identical to the second voiceprint pattern.

In one embodiment of the present disclosure, a method for monitoring crack noise is provided, and the method is suitable for detecting whether a semiconductor element tested on the testing apparatus is cracked. The method includes several steps as follows. At least one first voiceprint pattern is provided; a sound wave sent from the semiconductor element through the testing apparatus is received; the sound wave is converted into a second voiceprint pattern; the first voiceprint pattern and the second voiceprint pattern are compared to determine whether the first voiceprint pattern is identical to the second voiceprint pattern; and If it is determined that the first voiceprint pattern is identical to the second voiceprint pattern, an alarm is issued outwardly.

Thus, through the construction of the embodiments above, the disclosure can detect whether the semiconductor element is damaged or cracked in real time, so as to effectively avoid the growth of the defective rate of the semiconductor element for reducing the subsequent quality control cost and maintenance costs.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1:
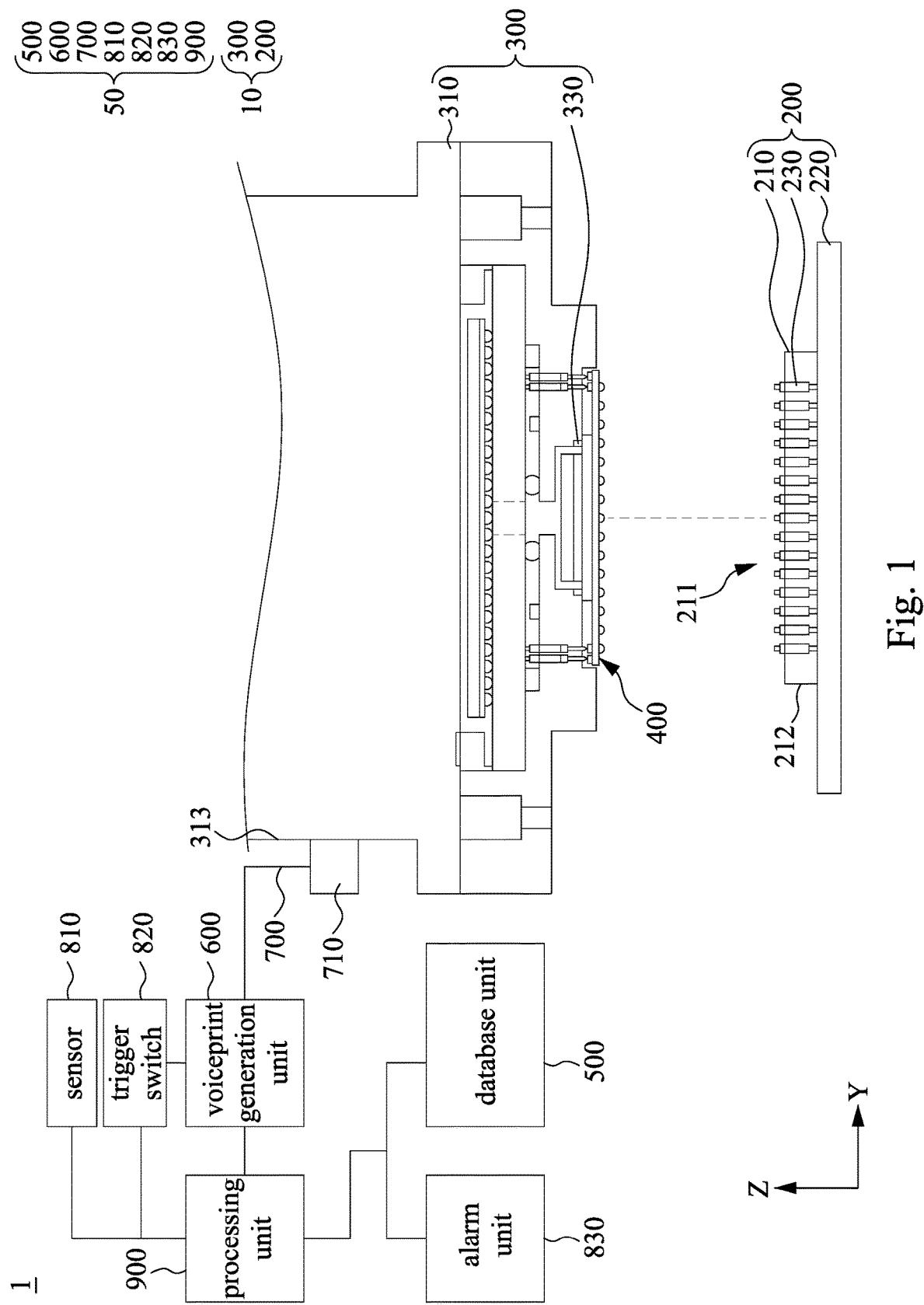
FIG. 1 is a schematic view of a testing system according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

Figure 2:
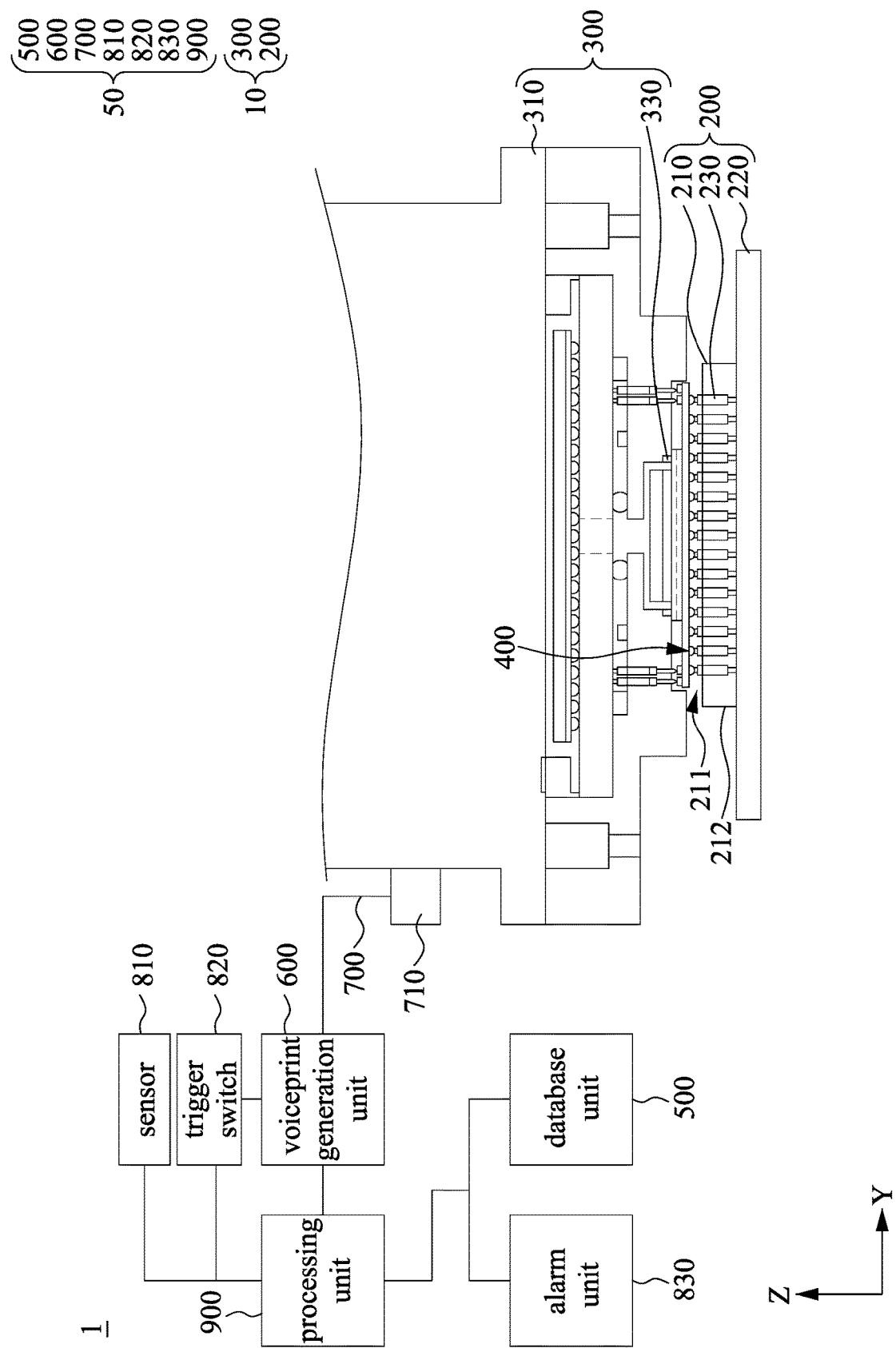
FIG. 2 is an operational schematic view of the testing system of FIG. 1.

Reference is now made to FIG. 1 to FIG. 2, in which FIG. 1 is a schematic view of a testing system 1 according to one embodiment of the present disclosure, and FIG. 2 is an operational schematic view of the testing system 1 of FIG. 1. As shown in FIG. 1 and FIG. 2, the testing system 1 includes a testing apparatus 10 and a crack noise monitoring device 50. The testing apparatus 10 includes a testing stage 200 and an element pickup module 300. The element pickup module 300 is able to pick up a semiconductor element 400 and press the semiconductor element 400 down on the testing stage 200 for performing the electrical testing on the semiconductor element 400. The element pickup module 300 is located above the testing stage 200, and the element pickup module 300 is movable towards the testing stage 200 or away from the testing stage 200.

The crack noise monitoring device 50 includes a database unit 500, a voiceprint generation unit 600, a sound conduction set 700 and a processing unit 900. The database unit 500 includes at least one type of a first voiceprint pattern. The database unit 500 is, for example, a hard disk, a memory or a cloud device, however, the disclosure is not limited to this. The first voiceprint pattern is a cracking sound generated by the split of the semiconductor element 400, and the first voiceprint pattern is pre-collected data. When the first voiceprint pattern is in plural types, the first voiceprint patterns are different from one another, and the first voiceprint patterns are corresponded to different kinds of cracking sounds of the splits respectively generated at different local positions of the semiconductor element 400. The sound conduction set 700 is connected to the voiceprint generation unit 600 and the testing apparatus 10, and the sound conduction set 700 is able to transmit a sound wave of the semiconductor element 400 to the voiceprint generation unit 600 after the sound wave is sent to the sound conduction set 700 via the testing apparatus 10. The voiceprint generation unit 600 receives and converts the sound wave into a second voiceprint pattern. The processing unit 900 is electrically connected to the voiceprint generating unit 600 and the database unit 500, for example, the processing unit 900 is a central processing unit (CPU) or a single chip device containing a particular program, however, the present disclosure is not limited thereto. The processing unit 900 is used to compare the first voiceprint pattern and the second voiceprint pattern to determine whether the first voiceprint pattern is identical to the second voiceprint pattern. Thus, if it is determined that the first voiceprint pattern is identical to the second voiceprint pattern, it indicates that the semiconductor element 400 may possibly be cracked; otherwise, it indicates that the semiconductor element 400 may not be cracked yet.

Thus, through the construction of the embodiments above, the disclosure can detect whether the semiconductor element is damaged or cracked in real time, so as to effectively avoid the growth of the defective rate of the semiconductor element for reducing the subsequent quality control cost and maintenance costs.

It is noted, the above-mentioned first voiceprint pattern and the above-mentioned second voiceprint pattern can be derived from the acoustic wave spectrum pattern reflected by the electroacoustic instrument. If the waveform patterns of the first voiceprint pattern and the second voiceprint pattern are consistent completely, or at least approximately the same, it is determined that the first voiceprint pattern and the second voiceprint pattern are identical to each other. Since the operation details of voiceprint recognition are well known, the operation details of voiceprint recognition will no longer be repeated here.

Specifically, as shown in FIG. 1, the testing stage 200 includes a base 210, a circuit board 220 and a plurality of terminals 230. The base 210 is disposed on the circuit board 220, and provided with a testing area 211. The terminals 230 are spaced arranged within the testing area 211 in a horizontal direction (e.g., axis Y), and electrically connected to the circuit board 220 through the base 210, respectively. For example, each of the terminals 230 is a pogo pin.

The element pickup module 300 includes a mobile arm 310 and a pressure-buffering portion 330. The mobile arm 310 is movable towards the testing stage 200. The pressure-buffering portion 330 is disposed on one side of the mobile arm 310 facing towards the testing stage 200 (i.e., a bottom portion 312 of the mobile arm 310) for fixedly picking the semiconductor element 400. For example, the mobile arm 310 can be driven by a machine or a cylinder to press the semiconductor element 400 down on the testing stage 200 in a vertical direction (for example, the Z axis).

In the embodiment, the sound conduction set 700 is directly connected to an outer sidewall 313 of the mobile arm 310. Thus, if the semiconductor element 400 is cracked to form a split, the sound wave of the split can be transmitted to the sound conduction set 700 through the mobile arm 310 according to the conduction of the solid material of the mobile arm 310, and then transmitted to the voiceprint generation unit 600 through the sound conduction set 700. However, the disclosure is not limited thereto, in another embodiment, in order to get closer to the semiconductor element 400, the sound conduction set 700 may also be configured to be directly connected to the bottom portion 312 of the mobile arm 310, the outer sidewall 212 of the base 210, or one side of the base 210 facing towards the mobile arm 310.

In the embodiment, the crack noise monitoring device 50 further includes a sensor 810 and a trigger switch 820. The sensor 810 is electrically connected to the processing unit 900 for detecting whether the semiconductor element 400 is being pressed down on the testing stage 200. The trigger switch 820 is electrically connected to the processing unit 900 and the voiceprint generation unit 600. Thus, when it is detected that the semiconductor element 400 is being pressed to the testing stage 200 in an instant, the processing unit 900 controls the trigger switch 820 to activate the voiceprint generation unit 600. Thus, within a predetermined interval, the voiceprint generation unit 600 starts to receive the sound wave transmitted from the semiconductor element 400 through the testing apparatus 10, and converts the sound wave into the second voiceprint pattern for subsequent comparison and determination by the processing unit 900.

For example, the predetermined interval is set as a time period from the beginning of the semiconductor element 400 pressed down to the completion of the semiconductor element 400 pressed down. The starting point for monitoring the split of the semiconductor element 400 is 200 milliseconds before the semiconductor element 400 reaches the testing area 211 and the ending point for monitoring the same is 300 milliseconds after the semiconductor element 400 reaches the testing area 211, so the predetermined interval is about 500 milliseconds in total. In this embodiment, the sensor 810 is, for example, a conventional method such as pressure sensing detection, light detection, or image detection. However, the present disclosure is not limited thereto.

In the embodiment, for example, the crack noise monitoring device 50 further includes an alarm unit 830 electrically connected to the processing unit 900. The alarm unit 830 is a device operating by video, sound, light or driving other machines, for example, the alarm unit 830 is a buzzer. However, the present disclosure is not limited thereto. Thus, when it is determined that the first voiceprint pattern is identical to the second voiceprint pattern, the processing unit 900 controls the alarm unit 830 to issue an alarm outwardly. When it is determined that the first voiceprint pattern is not identical to the second voiceprint pattern, the processing unit 900 controls the alarm unit 830 to be inaction, or issues other type of message outwardly. The present disclosure is not limited thereto. In other embodiments, the present disclosure can omit the alarm unit, or use similar ways that can inform the split.

Figure 3:
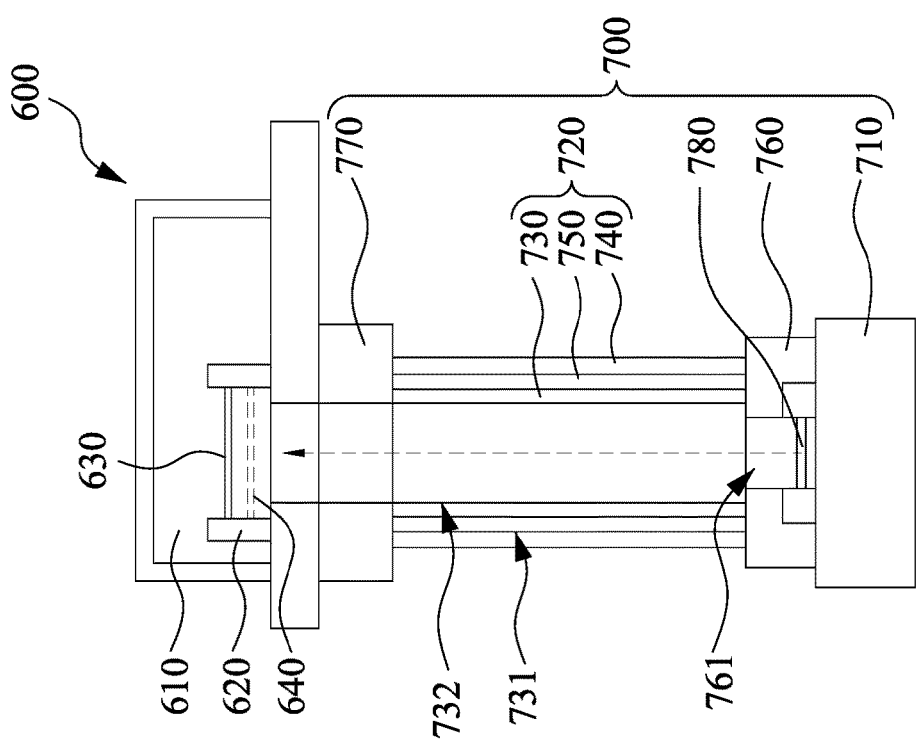
FIG. 3 is a schematic view of a voiceprint generation unit and a sound conduction set of a crack noise monitoring device according to one embodiment of the present disclosure.

FIG. 3 is a schematic view of a voiceprint generation unit 600 and a sound conduction set 700 of a crack noise monitoring device 50 according to one embodiment of the present disclosure. More specifically, as shown in FIG. 1 and FIG. 3, the sound conduction set 700 includes a solid conductive vibrator 710, a sound guide tube 720 and a diaphragm 780. The solid conductive vibrator 710 is directly connected to the mobile arm 310 for receiving vibration transmitted from the semiconductor element 400 through the testing apparatus 10. For example, the solid conductive vibrator 710 is a solid metal block, which is adhered to the outer sidewall 313 of the mobile arm 310 by a fixing adhesive, or integrally formed with the mobile arm 310. The pipeline of the sound guide tube 720 is respectively fixedly connected to the solid conductive vibrator 710 and the voiceprint generation unit 600. Furthermore, one end of the sound guide tube 720 is fixed to the solid conductive vibrator 710 through a first fixing ring 760, the other end of the sound guide tube 720 is fixed to the voiceprint generation unit 600 through a second fixing ring 770. The sound guide tube 720 is in communication with the solid conductive vibrator 710 and the voiceprint generation unit 600. In addition, the sound guide tube 720 is not limited to a hard type or a soft type thereof. The first fixing ring 760 is formed with an opening 761 that is in communication with a sound transmission channel 732 of the sound guide tube 720. The diaphragm 780 is disposed within the sound guide tube 720. For example, the diaphragm 780 is tightly located within the opening 761 of the first fixing ring 760. The diaphragm 780 is used to push air in the sound transmission channel 732 of the sound guide tube 720 for converting into a corresponding sound wave towards the voiceprint generation unit 600 according to the vibration received from the semiconductor element 400 through the testing apparatus 10.

The sound guide tube 720 includes a soundproof inner tube 730, a soundproof outer tube 740 and a porous sound-absorbing material 750. The soundproof inner tube 730 includes the aforementioned sound transmission channel 732 which penetrates through two opposite ends of the soundproof inner tube 730. The soundproof outer tube 740 surrounds the soundproof inner tube 730 such that an enclosed space 731 is defined between the soundproof inner tube 730 and the soundproof outer tube 740 to surround the sound transmission channel 732. The porous sound-absorbing material 750 is filled in the enclosed space 731 to surround the soundproof inner tube 730 and the sound transmission channel 732. In other words, the sound guide tube 720 is designed with a three-layer coating which are the soundproof inner tube 730, the porous sound-absorbing material 750, and the soundproof outer tube 740 in an order from inside to outside of the sound conduction set 700, so that the noise factor of the sound wave can be optimally blocked.

For example, the voiceprint generation unit 600 includes a micro-electromechanical (MEMS) microphone unit containing a sound chamber 610, two microelectromechanical chips 620, a fixed electrode plate 630 and a vibrating electrode diaphragm 640 therein. The fixed electrode plate 630 is connected to the microelectromechanical chips 620. The vibrating electrode diaphragm 640 is connected to the microelectromechanical chips 620, attached on one side of the fixed electrode plate 630, and faced towards the sound conduction set 700. Thus, when the sound wave passes through the sound conduction set 700 to reach the vibrating electrode diaphragm 640 in the sound chamber 610, the vibrating electrode diaphragm 640 vibrates due to sound pressure, thereby generating a second voiceprint pattern through the electrical signal. Since the micro-electromechanical (MEMS) microphone unit is a well-known technique, it will be no longer repeatedly described again. However, in other embodiments, the voiceprint generation unit may also be other voiceprint analysis machines capable of converting a sound wave into a voiceprint pattern.

Figure 4:
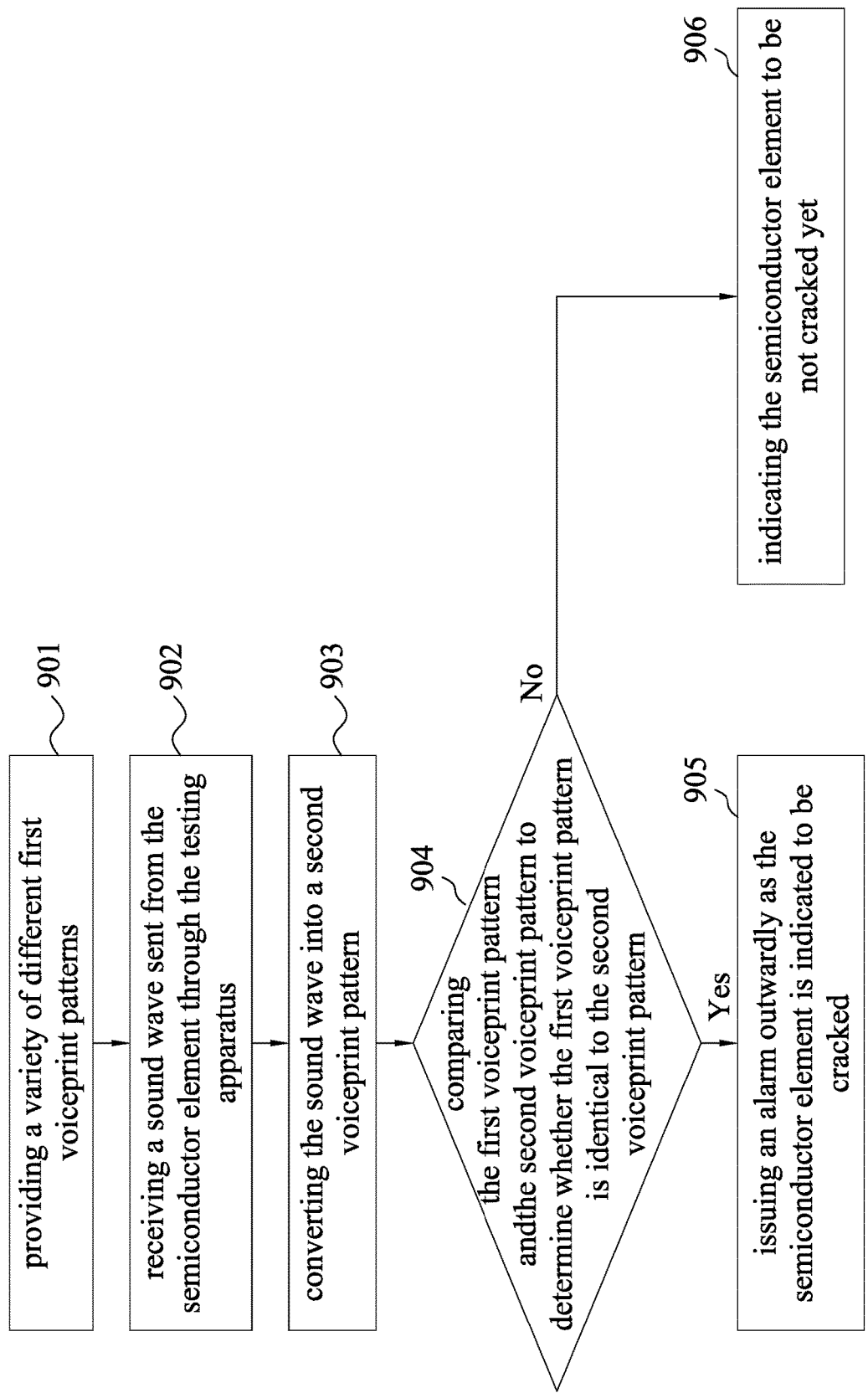
FIG. 4 is a flow chart of a method for monitoring crack noise according to one embodiment of the present disclosure.

FIG. 4 is a flow chart of a method for monitoring crack noise according to one embodiment of the present disclosure. As shown in FIG. 4, the method for monitoring crack noise provided in the disclosure is suitable for detecting whether a semiconductor element 400 tested on the aforementioned testing apparatus 10 is cracked. The method includes step 901 to step 905. In step 901, a variety of different first voiceprint patterns is provided. In step 902, a sound wave sent from the semiconductor element 400 through the testing apparatus 10 is received. In step 903, the sound wave is converted into a second voiceprint pattern. In step 904, the first voiceprint pattern and the second voiceprint pattern are compared to determine whether the first voiceprint pattern is identical to the second voiceprint pattern, if yes, go to step 905, otherwise, go to step 906. In step 905, when it is determined that the first voiceprint pattern is identical to the second voiceprint pattern, an alarm is issued outwardly as the semiconductor element 400 is indicated to be cracked. In step 906, the semiconductor element 400 is indicated to be not cracked yet.

Furthermore, before step 902 of the embodiment is performed, the method for monitoring crack noise further includes steps as follows. A detection is performed as to determine whether the semiconductor element 400 is pressed on the testing stage 200 of the testing apparatus. Next, when it is detected that the semiconductor element 400 is being pressed to the testing stage in an instant, in response to that, the sound wave sent from the semiconductor element 400 through the testing apparatus 10 is started to be received immediately, otherwise, any sound wave is not received.

Figure 5:
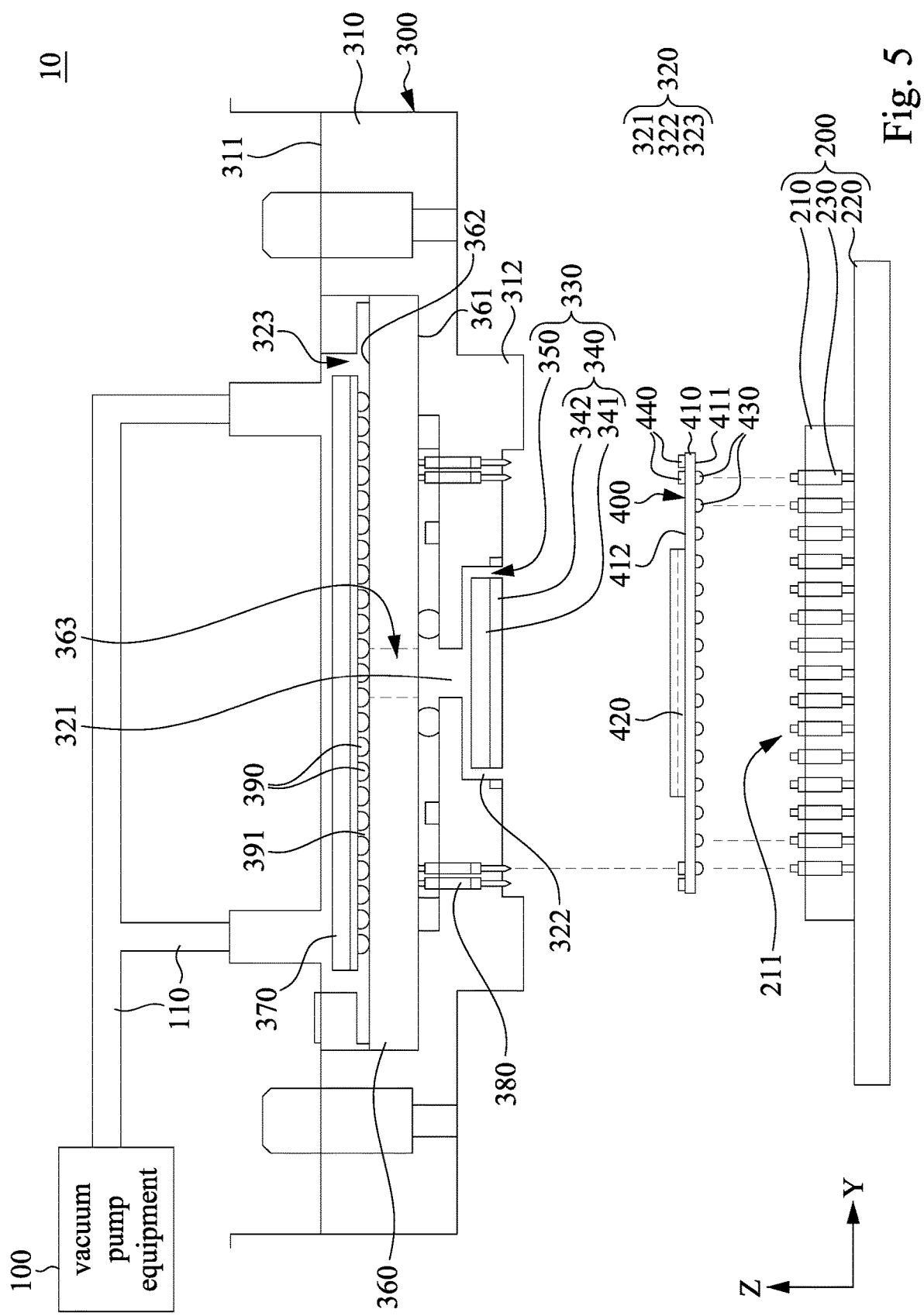
FIG. 5 is an exploded view of a testing apparatus according to one embodiment of the present disclosure.
Figure 6:
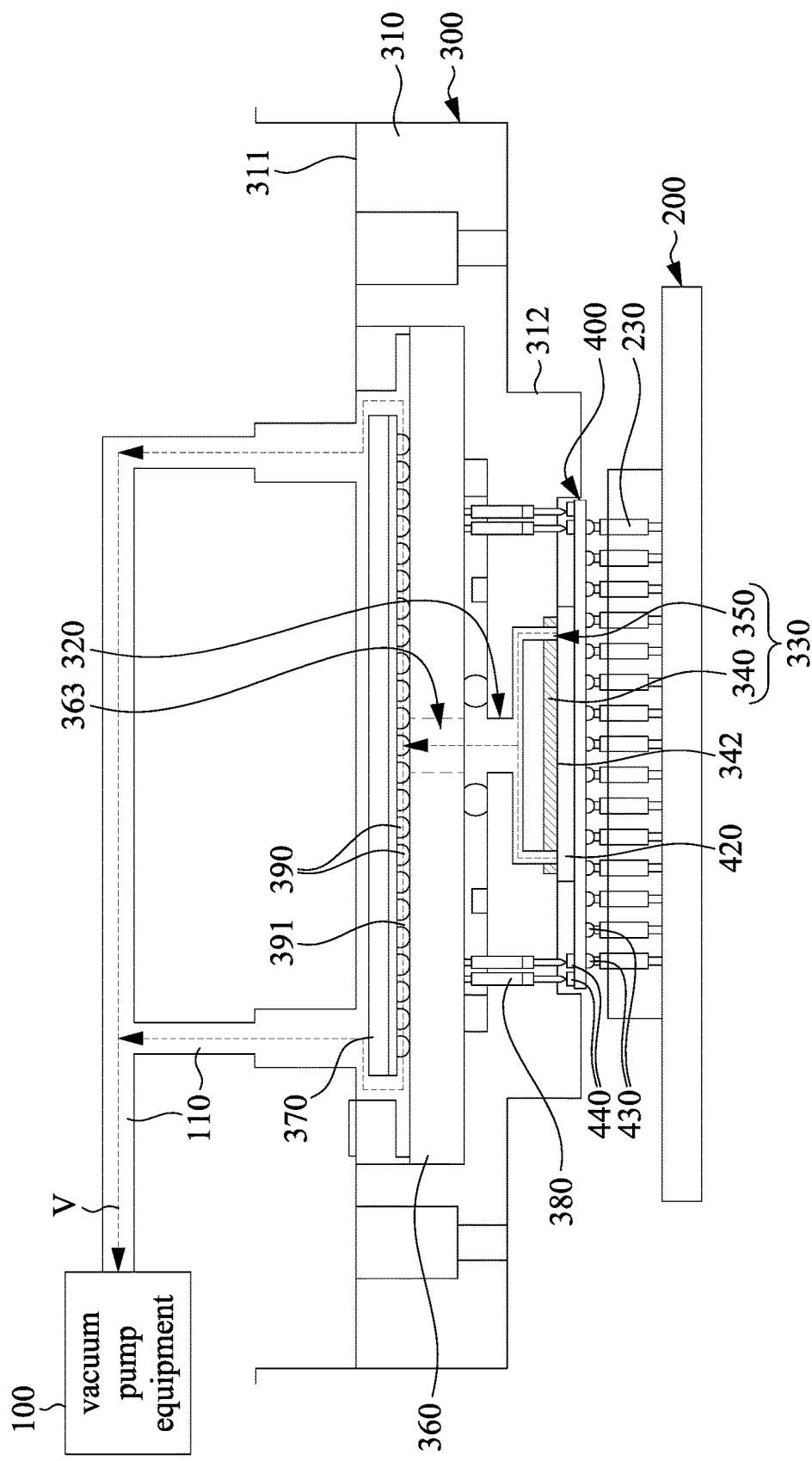
FIG. 6 is an assembling view of the testing apparatus of FIG. 5.

FIG. 5 is an exploded view of a testing apparatus according to one embodiment of the present disclosure, and FIG. 6 is an assembling view of the testing apparatus of FIG. 5. As shown in FIG. 5 and FIG. 6, in order to reduce the possibilities of the semiconductor element 400 getting damaged or cracked under pressure, the testing apparatus 10 further includes a vacuum pump equipment 100, and the element pickup module 300 further includes an air passage set 320. The pressure-buffering portion 330 includes an elastic pad 340 and a plurality of penetrating openings 350. The elastic pad 340 is in a flat shape, and the elastic pad 340 includes an installation surface 341 and a flat surface 342 that are opposite to each other. The installation surface 341 of the elastic pad 340 is fixedly connected to a bottom portion 312 of the mobile arm 310. The penetrating openings 350 are spaced arranged on the elastic pad 340. Each of the penetrating openings 350 goes through the elastic pad 340 to be connected to the installation surface 341 and the flat surface 342, respectively. The air passage set 320 is disposed within the mobile arm 310, and respectively connected to the vacuum pump equipment 100 and the bottom portion 312 of the mobile arm 310. One end of the air passage set 320 is in communication with the vacuum pump equipment 100, the other end of the air passage set 320 is in communication with the penetrating openings 350 through the bottom portion 312 of the mobile arm 310. With the vacuum suction force V provided by the vacuum pump equipment 100, a semiconductor element 400 (e.g., semiconductor product) can be fixedly sucked on the flat surface 342 of the elastic pad 340 through the penetrating openings 350 by a vacuum adsorption fashion.

Thus, when the mobile arm 310 is moved to the semiconductor element 400, the mobile arm 310 directly flat contacts with one side of the semiconductor element 400 using the flat surface 342 of the elastic pad 340, and the mobile arm 310 fixedly sucks the semiconductor element 400 through the vacuum suction force V from the penetrating openings 350. Accordingly, the mobile arm 310 is able to pick up the semiconductor element 400 and then move the semiconductor element 400 above the testing area 211; next, when the mobile arm 310 presses the semiconductor element 400 down to the testing area 211 in a vertical direction (e.g., axis Z), the other side of the semiconductor element 400 can be electrically connected to the terminals 230 located within the testing area 211 for processing the testing procedure. Therefore, when the semiconductor element 400 is pressed down to the testing area 211, the possibilities of the semiconductor element getting damaged or cracked under pressure can be reduced, and the warpage of the semiconductor element can be slowed down, thereby making the semiconductor element 400 no easy to be cracked.

It is noted, since the elastic pad 340 is airtight, no external air can penetrate between the flat surface 342 of the elastic pad 340 and the semiconductor element 400; because the elastic pad 340 is compressible, when the semiconductor element 400 is pressed to be sandwiched between the elastic pad 340 and the terminals 230, the pressure-buffering portion 330 is able to reduce the opposing pressure force of the semiconductor element 400 by the compression of the elastic pad 340, thereby reducing the possibilities of the semiconductor element 400 being cracked; since the elastic pad 340 is soft, the flat surface 342 of the elastic pad 340 will not damage the side of the semiconductor element 400. For example, the elastic pad 340 includes a rubber pad, a silicon rubber pad or an indium foil, etc. However, the present disclosure is not limited to this.

Furthermore, as shown in FIG. 5 and FIG. 6, the element pickup module 300 further includes a printed wiring board 360, a memory unit 370 and a plurality of probe pins 380. The probe pins 380 are contributed on the mobile arm 310, respectively soldered on a bottom surface 361 of the printed wiring board 360 for contacting one main surface of the semiconductor element 400, and the pressure-buffering portion 330 is located among the probe pins 380. The memory unit 370 is soldered on a top surface 362 of the printed wiring board 360, and electrically connected to the probe pins 380 for testing the semiconductor element 400. More particularly, the memory unit 370 is soldered to the top surface 362 of the printed wiring board 360 through a plurality of soldering materials 390, so that an air gap 391 is defined between the memory unit 370, the printed wiring board 360 and the solder materials 390. For example, the memory unit 370 is a high-speed double data rate (DDR) memory unit, however, the present disclosure is not limited to this.

Also, the air passage set 320 comprises a main pipe 321 and a plurality of sub-pipes 322 collectively in communication with the main pipe 321 and directly connected to the penetrating openings 350 respectively. In this embodiment, each of the sub-pipes 322 is L-shaped, one end of each of the sub-pipes 322 is exposed from the bottom portion 312 of the mobile arm 310, and the other end of each of the sub-pipes 322 is connected to the main pipe 321. The printed wiring board 360 is further formed with a through hole 363. The through hole 363 is located between the main pipe 321 and the aforementioned air gap 391, is coaxially aligned with the main pipe 321, and connected with the main pipe 321 and the aforementioned air gap 391, respectively.

Furthermore, the air passage set 320 further includes a configuration recess 323 concavely formed at the top 311 of the mobile arm 310 facing away from the pressure-buffering portion 330 for accommodating the above-mentioned printed wiring board 360, the memory unit 370 and the probe pins 380. In addition, the configuration recess 323 is further connected to the vacuum pump equipment 100 through pipelines 110. Thus, when the vacuum pump equipment 100 starts to provide vacuum suction force V, that is, air in the air passage set 320 starts to be drawn back to the vacuum pump equipment 100 through the through hole 363 of the printed wiring board 360, the air gap 391 and the configuration recess 323 in order to perform the process of the semiconductor element 400 being sucked to the pressure-buffering portion 330 by the vacuum adsorption fashion.

More specifically, the semiconductor element 400 includes a substrate 410, a bare die element 420, a plurality of solder balls 430 and a plurality of contacting points 440. The substrate 410 is formed with a first surface 411 and a second surface 412 which are opposite to each other. The solder balls 430 are spaced arranged on the first surface 411 of the substrate 410 in the horizontal direction (e.g., axis Y). The contacting points 440 are spaced arranged on the second surface 412 of the substrate 410 in the horizontal direction (e.g., axis Y). The bare die element 420 is disposed on the second surface 412 of the substrate 410 between the contacting points 440 for directly flat contacting with the flat surface 342 of the elastic pad 340. An area of the bare die element 420 is not greater than an area of the flat surface 342 of the elastic pad 340.

Therefore, when the pressure-buffering portion 330 sucks the semiconductor element 400, the flat surface 342 of the elastic pad 340 directly flat contacts with one surface of the bare die element 420 facing away from the substrate 410 to suck the surface of the bare die element 420 by the vacuum suction force V from the penetrating openings 350. In addition, when the pressure-buffering portion 330 presses the semiconductor element 400 down on the testing area 211, the semiconductor element 400 is pressed to be sandwiched between the elastic pad 340 and the terminals 230, so that the contacting points 440 of the semiconductor element 400 are respectively in contact with the probe pins 380, and the solder balls 430 of the semiconductor element 400 are respectively in contact with the terminals 230 of the testing stage 200. It is noted, since two pressure forces respectively applied to the two opposite main surfaces of the semiconductor element 400 by the pressure-buffering portion 330 and the terminals 230 are substantially the same, the semiconductor element 400 will not be damaged and cracked when being pressed.

Figure 7:
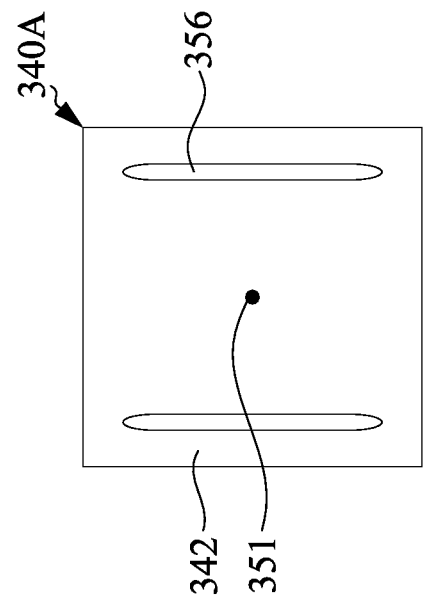
FIG. 7 is a front view of an elastic pad of the element pickup module of FIG. 5.
Figure 8:
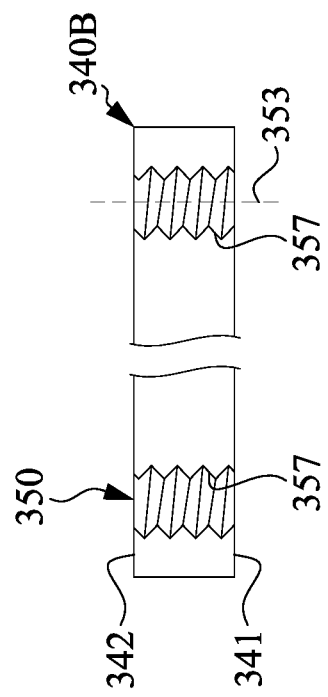
FIG. 8 is a partial cross-sectional view of the penetrating openings of FIG. 7 viewed along a line A-A.

Reference is now made to FIG. 7 to FIG. 8, in which FIG. 7 is a front view of an elastic pad 340 of the element pickup module 300 of FIG. 5, and FIG. 8 is a partial cross-sectional view of the penetrating openings 350 of FIG. 7 viewed along a line A-A. As shown in FIG. 5 and FIG. 7, in the embodiment, the flat surface 342 of the elastic pad 340 is provided with a geometric pattern such as a rectangle, for example. The penetrating openings 350 are symmetrically arranged on the flat surface 342 of the elastic pad 340, and separated from a centroid 351 of the geometric pattern. In other word, none of the penetrating openings 350 is overlapped with the centroid 351 of the geometric pattern so that the vacuum suction force V from the penetrating openings 350 of the elastic pad 340 can be evenly distributed on the elastic pad 340 rather than being centralized to the center (e.g., centroid 351) of the flat surface 342 of the elastic pad 340, thereby balancing the forces respectively applied on the semiconductor element 400 (FIG. 6) by the pressure-buffering portion 330 and the terminals 230.

Also, specifically, as shown in FIG. 6 and FIG. 7, the flat surface 342 is presented as, for example a rectangle having four corners 352, and the penetrating openings 350 are arranged at the corners 352 of the rectangle of the flat surface 342 so as to balance the forces applied on the semiconductor element 400 by the pressure-buffering portion 330 and the terminals 230, respectively. Each of the penetrating openings 350 includes a round hole 354, and the number of the round holes 354 and the number of the sub-pipes 322 are the same. Each of the penetrating openings 350 includes a straight inner surface 355 completely surrounding the round holes 354.

Figure 9:
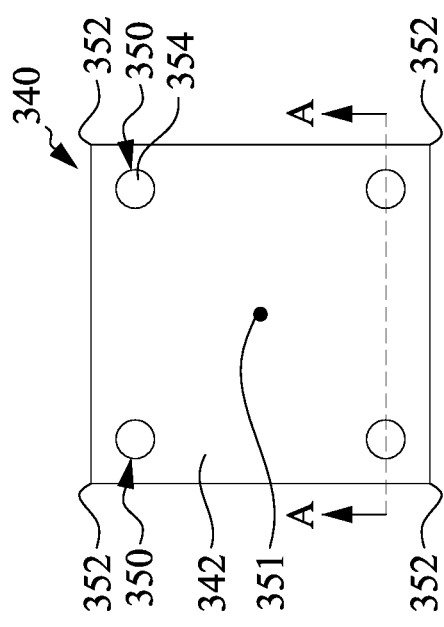
FIG. 9 is a front view of an elastic pad according to one embodiment of the present disclosure.

FIG. 9 is a front view of an elastic pad 340A according to one embodiment of the present disclosure. As shown in FIG. 9, the elastic pad 340A in the embodiment is substantially the same as the elastic pad 340 of FIG. 3, except that the number of the penetrating openings 350 of the elastic pad 340A is two, and each of the penetrating openings 350 includes an elongated slot 356, rather than a round hole. Each of the elongated slots 356 is in communication with one or more of the sub-pipes 322, and the number of the elongated slots 356 is not greater than the number of the sub-pipes 322.

Figure 10:
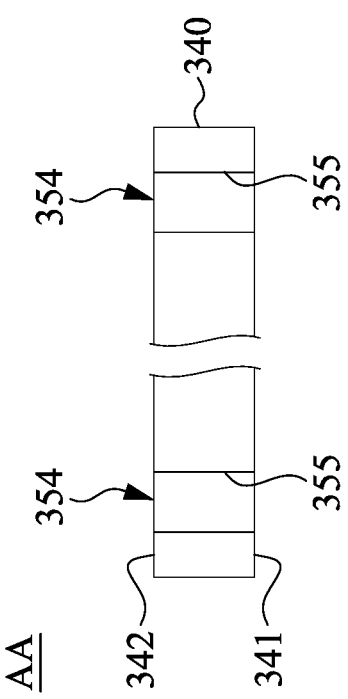
FIG. 10 is a longitudinal cross-sectional view of the penetrating openings of the elastic pad of the element pickup module according to one embodiment of the present disclosure.

FIG. 10 is a longitudinal cross-sectional view of the penetrating openings 350 of the elastic pad 340B of the element pickup module 300 according to one embodiment of the present disclosure. As shown in FIG. 10, the elastic pad 340B in the embodiment is substantially the same as the elastic pad 340 of FIG. 7, except that each of the penetrating openings 350 includes a spiral inner surface 357 rather than the straight inner surface of the penetrating opening. The spiral inner surface 357 surrounds the axis 353 of the penetrating openings 350 in a spiral manner. However, the present disclosure is not limited to the type of the inner wall of the penetrating openings 350. In this way, since each of the penetrating openings 350 has a spiral inner surface 357, when the elastic pad 340B is compressed, the penetrating openings 350 can be smoother and not blocked.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A testing system, comprising:
    a testing apparatus comprising a testing stage and an element pickup module for pressing a semiconductor element down on the testing stage; and
    a crack noise monitoring device comprising a voiceprint generation unit, a database unit having at least one first voiceprint pattern, a sound conduction set connected to the voiceprint generation unit and the testing apparatus, and a processing unit electrically connected to the voiceprint generating unit and the database unit,
    wherein the sound conduction set is configured to transmit a sound wave of the semiconductor element to the voiceprint generation unit after the sound wave is sent to the sound conduction set via the testing apparatus, the sound conduction set comprises a solid conductive vibrator directly connected to the element pickup module, and configured to receive vibration generated from the semiconductor element via the element pickup module; a sound guide tube respectively fixedly connected to the voiceprint generation unit and the solid conductive vibrator; and a diaphragm disposed within the sound guide tube, and configured to convert the vibration into the sound wave and transmit the sound wave to the voiceprint generation unit,
    the voiceprint generation unit is configured to receive and convert the sound wave into a second voiceprint pattern, and
    the processing unit is configured to compare the at least one first voiceprint pattern and the second voiceprint pattern to determine whether the at least one first voiceprint pattern is identical to the second voiceprint pattern.

2. The testing system of claim 1, wherein the element pickup module comprises:
    a mobile arm movable towards the testing stage; and
    a pressure-buffering portion disposed on one side of the mobile arm facing towards the testing stage for picking the semiconductor element up.

3. The testing system of claim 1, wherein the crack noise monitoring device further comprises:
    a sensor electrically connected to the processing unit for detecting whether the semiconductor element is pressed on the testing stage; and a trigger switch electrically connected to the processing unit and the voiceprint generation unit, wherein when it is detected that the semiconductor element is pressed to the testing stage in an instant, the processing unit controls the trigger switch to activate the voiceprint generation unit.

4. The testing system of claim 2, wherein the sound guide tube comprises:

a soundproof inner tube comprising a sound transmission channel;

a soundproof outer tube surrounding the soundproof inner tube such that an enclosed space is defined between the soundproof inner tube and the soundproof outer tube to surround the sound transmission channel; and a porous sound-absorbing material filled in the enclosed space to surround the soundproof inner tube and the sound transmission channel.

5. The testing system of claim 2, wherein the solid conductive vibrator is directly connected to a bottom portion or an outer sidewall of the mobile arm.

6. The testing system of claim 1, wherein the crack noise monitoring device further comprises:

an alarm unit electrically connected to the processing unit for issuing an alarm outwardly when it is determined that the at least one first voiceprint pattern is identical to the second voiceprint pattern.

7. The testing system of claim 1, wherein when the at least one first voiceprint pattern is in plural types, the first voiceprint patterns are different from one another, and the first voiceprint patterns are corresponded to different kinds of cracking sounds of splits respectively generated at different positions of the semiconductor element.

8. The testing system of claim 1, wherein the testing stage comprises a base, a circuit board and a plurality of terminals, the base is disposed on the circuit board, and provided with a testing area, the terminals are spaced arranged within the testing area, and electrically connected to the circuit board through the base, respectively, wherein the sound conduction set is directly connected to the base.

9. The testing system of claim 8, wherein the sound conduction set is directly connected to a top portion or an outer sidewall of the base.

10. The testing system of claim 8, wherein the voiceprint generating unit comprises a micro-electromechanical (MEMS) microphone unit.

11. A crack noise monitoring device suitable for detecting whether a semiconductor element being tested on a testing apparatus is cracked, and the crack noise monitoring device comprising:

a database unit comprising at least one first voiceprint pattern;

a voiceprint generation unit configured to receive a sound wave and convert the sound wave into a second voiceprint pattern; and a sound conduction set electrically connected to the voiceprint generation unit for transmitting the sound wave to the voiceprint generation unit, the sound conduction set comprises a solid conductive vibrator directly connected to an element pickup module of the testing apparatus, and configured to receive vibration generated from the semiconductor element via the element pickup module; a sound guide tube respectively fixedly connected to the voiceprint generation unit and the solid conductive vibrator; and a diaphragm disposed within the sound guide tube, and configured to convert the vibration into the sound wave and transmit the sound wave to the voiceprint generation unit, wherein the sound wave is sent from the semiconductor element to the sound conduction set via the testing apparatus; and a processing unit electrically connected to the voiceprint generating unit and the database unit for comparing the at least one first voiceprint pattern and the second voiceprint pattern to determine whether the at least one first voiceprint pattern is identical to the second voiceprint pattern.

12. The crack noise monitoring device of claim 11, further comprising:

a sensor electrically connected to the processing unit for detecting whether the semiconductor element is pressed on a testing stage of the testing apparatus; and a trigger switch electrically connected to the processing unit and the voiceprint generation unit, wherein when it is detected that the semiconductor element is pressed to the testing stage in an instant, the processing unit controls the trigger switch to activate the voiceprint generation unit.

13. The crack noise monitoring device of claim 11, wherein the sound guide tube comprises:

a soundproof inner tube comprising a sound transmission channel;

a soundproof outer tube surrounding the soundproof inner tube such that an enclosed space is defined between the soundproof inner tube and the soundproof outer tube to surround the sound transmission channel; and a porous sound-absorbing material filled in the enclosed space to surround the soundproof inner tube and the sound transmission channel.

14. The crack noise monitoring device of claim 11, further comprising:

an alarm unit electrically connected to the processing unit and configured to send an alarm outwardly when it is determined that the at least one first voiceprint pattern is identical to the second voiceprint pattern.

15. The crack noise monitoring device of claim 11, wherein when the at least one first voiceprint pattern is in plural types, the first voiceprint patterns are different from one another each other, and the first voiceprint patterns are corresponded to different kinds of cracking sounds of splits respectively generated at different positions of the semiconductor element.

16. The crack noise monitoring device of claim 11, wherein the voiceprint generating unit comprises a micro-electromechanical (MEMS) microphone unit.

17. A method for monitoring crack noise, suitable for detecting whether a semiconductor element being tested on a testing apparatus is cracked, and the method comprising:

providing at least one first voiceprint pattern;

receiving vibration generated from the semiconductor element via the testing apparatus through a solid conductive vibrator directly connected to an element pickup module of the testing apparatus;

converting the vibration into a sound wave through a diaphragm disposed within a sound guide tube;

converting the sound wave into a second voiceprint pattern;

comparing the at least one first voiceprint pattern and the second voiceprint pattern to determine whether the at least one first voiceprint pattern is identical to the second voiceprint pattern; and when it is determined that the at least one first voiceprint pattern is identical to the second voiceprint pattern, issuing an alarm outwardly.

18. The method for monitoring crack noise of claim 17, further comprising:
    before the sound wave converted into the second voiceprint pattern, detecting whether the semiconductor element is pressed on a testing stage of the testing apparatus; and
    when it is detected that the semiconductor element is being pressed to the testing stage in an instant, immediately receiving the sound wave passed from the semiconductor element through the testing apparatus.

* * * * *